United States Patent
Dimitriadis et al.

(10) Patent No.: US 12,136,034 B2
(45) Date of Patent: Nov. 5, 2024

(54) DYNAMIC GRADIENT AGGREGATION FOR TRAINING NEURAL NETWORKS

(71) Applicant: Microsoft Technology Licensing, LLC, Redmond, WA (US)

(72) Inventors: Dimitrios B. Dimitriadis, Bellevue, WA (US); Kenichi Kumatani, Sammamish, WA (US); Robert Peter Gmyr, Bellevue, WA (US); Masaki Itagaki, Redmond, WA (US); Yashesh Gaur, Redmond, WA (US); Nanshan Zeng, Bellevue, WA (US); Xuedong Huang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1133 days.

(21) Appl. No.: 16/945,715

(22) Filed: Jul. 31, 2020

(65) Prior Publication Data

US 2022/0036178 A1 Feb. 3, 2022

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC .................................. G06N 3/08; G06N 3/04
USPC ........................................................ 706/15
See application file for complete search history.

(56) References Cited

U.S. PATENT DOCUMENTS

| | | |
|---|---|---|
| 2020/0242514 A1 | 7/2020 | Mcmahan et al. |
| 2021/0089878 A1 | 3/2021 | Greenewald et al. |
| 2021/0158216 A1 | 5/2021 | Du et al. |
| 2021/0192078 A1 | 6/2021 | Cosman et al. |
| 2022/0004935 A1 | 1/2022 | Lakshmanan et al. |
| 2023/0306313 A1 | 9/2023 | Dimitriadis et al. |

FOREIGN PATENT DOCUMENTS

| | | |
|---|---|---|
| WO | 2021022707 A1 | 2/2021 |
| WO | 2022020011 A1 | 1/2022 |

OTHER PUBLICATIONS

Dean, Jeffrey, Greg Corrado, Rajat Monga, Kai Chen, Matthieu Devin, Mark Mao, Marc'aurelio Ranzato et al. "Large scale distributed deep networks." Advances in neural information processing systems 25 (2012). 11 Pages (Year: 2012).*

(Continued)

*Primary Examiner* — Brian M Smith
(74) *Attorney, Agent, or Firm* — Foley IP Law, PLLC

(57) ABSTRACT

The disclosure herein describes training a global model based on a plurality of data sets. The global model is applied to each data set of the plurality of data sets and a plurality of gradients is generated based on that application. At least one gradient quality metric is determined for each gradient of the plurality of gradients. Based on the determined gradient quality metrics of the plurality of gradients, a plurality of weight factors is calculated. The plurality of gradients is transformed into a plurality of weighted gradients based on the calculated plurality of weight factors and a global gradient is generated based on the plurality of weighted gradients. The global model is updated based on the global gradient, wherein the updated global model, when applied to a data set, performs a task based on the data set and provides model output based on performing the task.

20 Claims, 7 Drawing Sheets

(56) References Cited

OTHER PUBLICATIONS

Ben-Nun, T., & Hoefler, T. (2019). Demystifying parallel and distributed deep learning: An in-depth concurrency analysis. ACM Computing Surveys (CSUR), 52(4), pp. 1-43. (Year: 2019).*

Zhou, Z., Zhang, Q., Lu, G., Wang, H., Zhang, W., & Yu, Y. (2018). Adashift: Decorrelation and convergence of adaptive learning rate methods. arXiv preprint arXiv:1810.00143. 26 Pages (Year: 2018).*

Reddi, S. J., Kale, S., & Kumar, S. (2019). On the convergence of adam and beyond. arXiv preprint arXiv:1904.09237. 23 Pages (Year: 2019).*

Wang, X. et al., "Improved end-to-end speech recognition using adaptive per-dimensional learning rate methods," IEICE Trans. Inf. & Syst., vol. E99-D, No. 10 (Oct. 2016) pp. 2250-2553. (Year: 2016).*

Xia, Y. et al., "Weighted speech distortion losses for neural-network-based real-time speech enhancement," IEEE Intl. Conf. on Acoustics, Speech, and Signal Processing (ICASSP 2020), pp. 871-875. (Year: 2020).*

"International Search Report and Written Opinion Issued in PCT Application No. PCT/US23/012872", Mailed Date: May 3, 2023, 13 Pages.

Wahab, et al., "Federated Machine Learning: Survey, Multi-Level Classification, Desirable Criteria and Future Directions in Communication and Networking Systems", In Journal of IEEE Communications Surveys & Tutorials, vol. 23, Issue 2, Feb. 10, 2021, pp. 1342-1397.

Allen-Zhu, et al., "Towards Understanding Ensemble, Knowledge Distillation and Self-Distillation in Deep Learning", In Repository of arXiv:2012.09816v2, Jul. 3, 2021, 70 Pages.

Ben-David, et al., "A Theory of Learning from Different Domains", In Journal of Machine Learning, vol. 79, Issue 1, Oct. 23, 2009, pp. 151-175.

Bhargava, et al., "Generalization in NLI: Ways (Not) to Go Beyond Simple Heuristics", In Repository of arXiv:2110.01518v1, Oct. 4, 2021, 11 Pages.

Cheng, et al., "FedGEMS: Federated Learning of Larger Server Models via Selective Knowledge Fusion", In Repository of arXiv:2110.11027v2, Dec. 7, 2021, 17 Pages.

He, et al., "Deep Residual Learning for Image Recognition", In Proceedings of the IEEE Conference on Computer Vision and Pattern Recognition, Jun. 27, 2016, pp. 770-778.

He, et al., "Group Knowledge Transfer: Federated Learning of Large CNNs at the Edge", In Proceedings of Advances in Neural Information Processing Systems, vol. 33, Dec. 6, 2020, 13 Pages.

Hinton, et al., "Distilling the Knowledge in a Neural Network", In Repository of arXiv:1503.02531v1, Mar. 9, 2015, 9 Pages.

Hong, et al., "Periodic Intra-Ensemble Knowledge Distillation for Reinforcement Learning", In Proceedings of Joint European Conference on Machine Learning and Knowledge Discovery in Databases, Sep. 13, 2021, 17 Pages.

Hsu, et al., "Measuring the Effects of Non-Identical Data Distribution for Federated Visual Classification", In Repository of arXiv:1909.06335v1, Sep. 13, 2019, 5 Pages.

Itahara, et al., "Distillation-Based Semi-Supervised Federated Learning for Communication-Efficient Collaborative Training with Non-iid Private Data", In Repository of arXiv:2008.06180v2, Jan. 20, 2021, 15 Pages.

Kairouz, et al., "Advances and Open Problems in Federated Learning", In Repository of arXiv:1912.04977v1, Dec. 10, 2019, 105 Pages.

Karimireddy, et al., "SCAFFOLD: Stochastic Controlled Averaging for On-Device Federated Learning", In Repository of arXiv:1910.06378v1, Oct. 14, 2019, 30 Pages.

Krizhevsky, Alex, "Learning Multiple Layers of Features From Tiny Images", In Technical report, Apr. 8, 2009, 60 Pages.

Lan, et al., "Knowledge Distillation by on-the-Fly Native Ensemble", In Proceedings of the 32nd International Conference on Neural Information Processing Systems, Dec. 3, 2018, 11 Pages.

Li, et al., "Federated Optimization for Heterogeneous Networks", In Proceedings of the 1st Adaptive & Multitask Learning Workshop, Jun. 15, 2019, 16 Pages.

Li, et al., "Model-Contrastive Federated Learning", In Proceedings of the IEEE/CVF Conference on Computer Vision and Pattern Recognition, Jun. 19, 2021, pp. 10713-10722.

Liang, et al., "Think Locally, Act Globally: Federated Learning with Local and Global Representations", In Repository of arXiv:2001.01523v3, Jul. 14, 2020, 34 Pages.

Lin, et al., "Ensemble Distillation for Robust Model Fusion in Federated Learning", In Proceedings of Advances in Neural Information Processing Systems, vol. 33, Dec. 6, 2020, 13 Pages.

Park, et al., "Feature-Level Ensemble Knowledge Distillation for Aggregating Knowledge from Multiple Networks", In Proceedings of 24th European Conference on Artificial Intelligence, vol. 325, Aug. 29, 2020, 8 Pages.

Simonyan, et al., "Very Deep Convolutional Networks for Large-Scale Image Recognition", In Repository of arXiv:1409.1556v5, Dec. 23, 2014, 13 Pages.

Tran, et al., "Hydra: Preserving Ensemble Diversity for Model Distillation", In Proceedings of ICLR Workshop on Uncertainty and Robustness in Deep Learning, Apr. 30, 2020, 10 Pages.

Wang, et al., "A Field Guide to Federated Optimization", In Repository of arXiv:2107.06917v1, Jul. 14, 2021, 88 Pages.

Yang, et al., "Overcoming Language Variation in Sentiment Analysis with Social Attention", In Journal of Transactions of the Association for Computational Linguistics, vol. 5, Aug. 2017, pp. 295-307.

Zhu, et al., "Data-Free Knowledge Distillation for Heterogeneous Federated Learning", In Proceedings of the 38th International Conference on Machine Learning, Jul. 18, 2021, 12 Pages.

Fung, et al., "Mitigating Sybils in Federated Learning Poisoning", In Reposotory of arXiv:1808.04866v1, Aug. 14, 2018, 15 Pages.

"International Search Report and Written Opinion Issued in PCT Application No. PCT/US21/030760", Mailed Date: Aug. 17, 2021, 12 Pages.

Ramakrishna, et al., "Augmenting Learning Components for Safety in Resource Constrained Autonomous Robots", In Repository of arXiv:1902.02432v1, Feb. 6, 2019, 10 Pages.

Abadi et al., "Tensorflow: A System for Large-Scale Machine Learning", In Proceedings of Symposium on Operating Systems Design and Implementation, Nov. 2, 2016, pp. 264-283.

Ba et al., "Layer Normalization", In Journal of Computing Research Repository, Jul. 21, 2016, 14 Pages.

Chan et al., "Listen, Attend and Spell", In Journal of Computing Research Repository, Aug. 20, 2015, pp. 1-16.

Chen et al., "Scalable Training of Deep Learning Machines by Incremental Block Training With Intra-Block Parallel Optimization and Blockwise Model-Update Filtering", In Proceedings of IEEE International Conference on Acoustics, Speech and Signal Processing, Mar. 20, 2016, pp. 5880-5884.

Chiu et al., "State-of-the-Art Speech Recognition with Sequence-to-Sequence Models", In Proceedings of IEEE International Conference on Acoustics, Speech and Signal Processing, Apr. 15, 2018, pp. 4774-4778.

Chorowski et al., "Attention-Based Models for Speech Recognition", In Proceedings of Advances in Neural Information Processing Systems, vol. 28, Dec. 7, 2015, 9 Pages.

Dimitriadis et al., "A Federated Approach in Training Acoustic Models", Retrieved from: https://www.microsoft.com/en-us/research/publication/a-federated-approach-in-training-acoustic-models/, Oct. 2020, 2 Pages.

Dimitriadis et al., "Project FTL: Status Review", Retrieved from: https://microsoft-my.sharepoint.com/:p:/p/didimit/EZSeeOfrwylEuheo4zVnplYBJV4ahN4WYR8HVHcvnwvA0w?e=1tReH1, Apr. 22, 2020. 19 Pages.

Epshteyn et al., "Active Reinforcement Learning", In Proceedings of the 25th International Conference on Machine learning, Jul. 2008, 8 Pages.

Fernandez et al., "Bidirectional LSTM Networks for Improved Phoneme Classification and Recognition", Retrieved from: https://mediatum.ub.tum.de/doc/1290195/file.pdf, Sep. 25, 2019, pp. 799-804.

(56) References Cited

OTHER PUBLICATIONS

Ginsburg et al., "Large Batch Training of Convolutonal Networks", Retrieved from: https://arxiv.org/pdf/1708.03888.pdf, Sep. 13, 2017, 8 Pages., Sep. 13, 2017, 8 Pages.

Goyal et al., "Accurate, Large Minibatch SGD: Training ImageNet in 1 Hour", In Journal of Computing Research Repository, Jun. 8, 2017, 12 Pages.

Graves, Alex, "Sequence Transduction with Recurrent Neural Networks", In Journal of Computing Research Repository, Nov. 14, 2012, 9 Pages.

Hoefler, "Demystifying Parallel and Distributed Deep Learning: An In-depth Concurrency Analysis", In ACM Computing Surveys vol. 52, Issue 4, Aug. 2019, 43 Pages.

Huang et al., "Semi-Supervised Training in Deep Learning Acoustic Model", Retrieved From: https://www.microsoft.com/en-us/research/publication/semi-supervised-training-deep-learning-acoustic-model/, Sep. 2016, 2 Pages.

Konecny et al., "Federated Optimization: Distributed Optimization Beyond the Datacenter", In Journal of Computing Research Repository, Nov. 11, 2015, pp. 1-5.

Ladkat et al., "Two Tiered Distributed Training Algorithm for Acoustic Modeling", In Proceedings of Interspeech, Sep. 15, 2019, pp. 1626-1630.

McMahan et al., "Communication-Efficient Learning of Deep Networks from Decentralized Data", In Proceedings of the 20th International Conference on Artificial Intelligence and Statistics, Apr. 20, 2017, 11 Pages.

Panayotov et al., "Librispeech: an Asr Corpus Based on Public Domain Audio Books", In International Conference on Acoustics, Speech and Signal Processing, Apr. 19, 2015, 5 Pages.

Pham et al., "Online Deep Learning: Learning Deep Neural Networks on the Fly", In Proceedings of the Twenty-Seventh International Joint Conference on Artificial Intelligence, Nov. 10, 2017, pp. 2660-2666.

Raju et al., "Improving Noise Robustness of Automatic Speech Recognition via Parallel Data and teacher Student learning", In Proceedings of IEEE International Conference on Acoustics, Speech and Signal Processing, Mar. 15, 2019, 5 Pages.

Rosenberg et al., "Speech Recognition with Augmented Synthesized Speech", In Proceedings of IEEE Automatic Speech Recognition and Understanding Workshop, Dec. 14, 2019, 7 Pages.

Sahu et al., "Federated Learning: Challenges, Methods, and Future Directions", In Journal of Computing Research Repository, Aug. 21, 2019, 21 Pages.

Sergeev et al., "Horovod: Fast and Easy Distributed Deep Learning in TensorFlow", In Journal of Computing Research Repository, Feb. 21, 2018, 10 Pages.

Shamir et al., "Communication Efficient Distributed Optimization Using an Approximate Newton-type Method", In Proceedings of the 31th International Conference on Machine Learning, Jun. 21, 2014, 22 Pages.

Button et al., "Reinforcement Learning: An Introduction", Published by The MIT Press, Jan. 1, 2018, 444 Pages.

Wolford, Ben, "A Guide to GDPR Data Privacy Requirements", https://web.archive.org/web/20200405212544/https://gdpr.eu/data-privacy/, Apr. 5, 2020, 4 Pages.

Zhao et al., "Large-Scale Domain Adaptation via Teacher-Student Learning", In Proceedings of 18th Annual Conference of the International Speech Communication Association, Aug. 20, 2017, 5 Pages.

* cited by examiner

DYNAMIC GRADIENT AGGREGATION FOR TRAINING NEURAL NETWORKS

BACKGROUND

Conventional distributed training methods typically treat each data source equally. In some situations, if all of the training data sets are not in good shape (e.g., the data contains many outlier values or is otherwise not reflective of typical data), those training data sets that are not in good shape may be filtered out or manually sorted prior to performing the training operations. However, such filtering and manual sorting often does not scale up when the set of training data sets come from different data sources and/or when there is a substantial quantity of training data sets with which to perform training operations. For example, if training data for automated speech recognition (ASR) contains unnaturally distorted speech that will never happen in the real world, it may be preferable to remove that training data or otherwise reduce the degree to which it affects the training operations, as including it may help improve robustness of a model against background noise or other factors that may negatively affect clarity of speech in audio data. Such a process may require significant manual trial-and-error and tuning to ensure that such training data is treated in a way that most efficiently trains an accurate ASR neural network model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for training a global model based on a plurality of data sets is described. The global model is applied to each data set of the plurality of data sets and a plurality of gradients is generated based on that application, wherein each gradient of the plurality of gradients is generated based on an individual data set of the plurality of data sets. A plurality of gradient quality metrics are determined, including at least one gradient quality metric for each individual gradient of the plurality of gradients, the at least one gradient quality metric indicating a degree to which the individual gradient can be used to improve the global model. Based on the determined gradient quality metrics of the plurality of gradients, a plurality of weight factors is calculated, wherein a weight factor is calculated for each gradient of the plurality of gradients. The plurality of gradients is then transformed into a plurality of weighted gradients based on the calculated plurality of weight factors and a global gradient is generated based on the plurality of weighted gradients. The global model is updated based on the global gradient, wherein the updated global model, when applied to a data set, performs a task based on the data set and provides model output based on performing the task.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
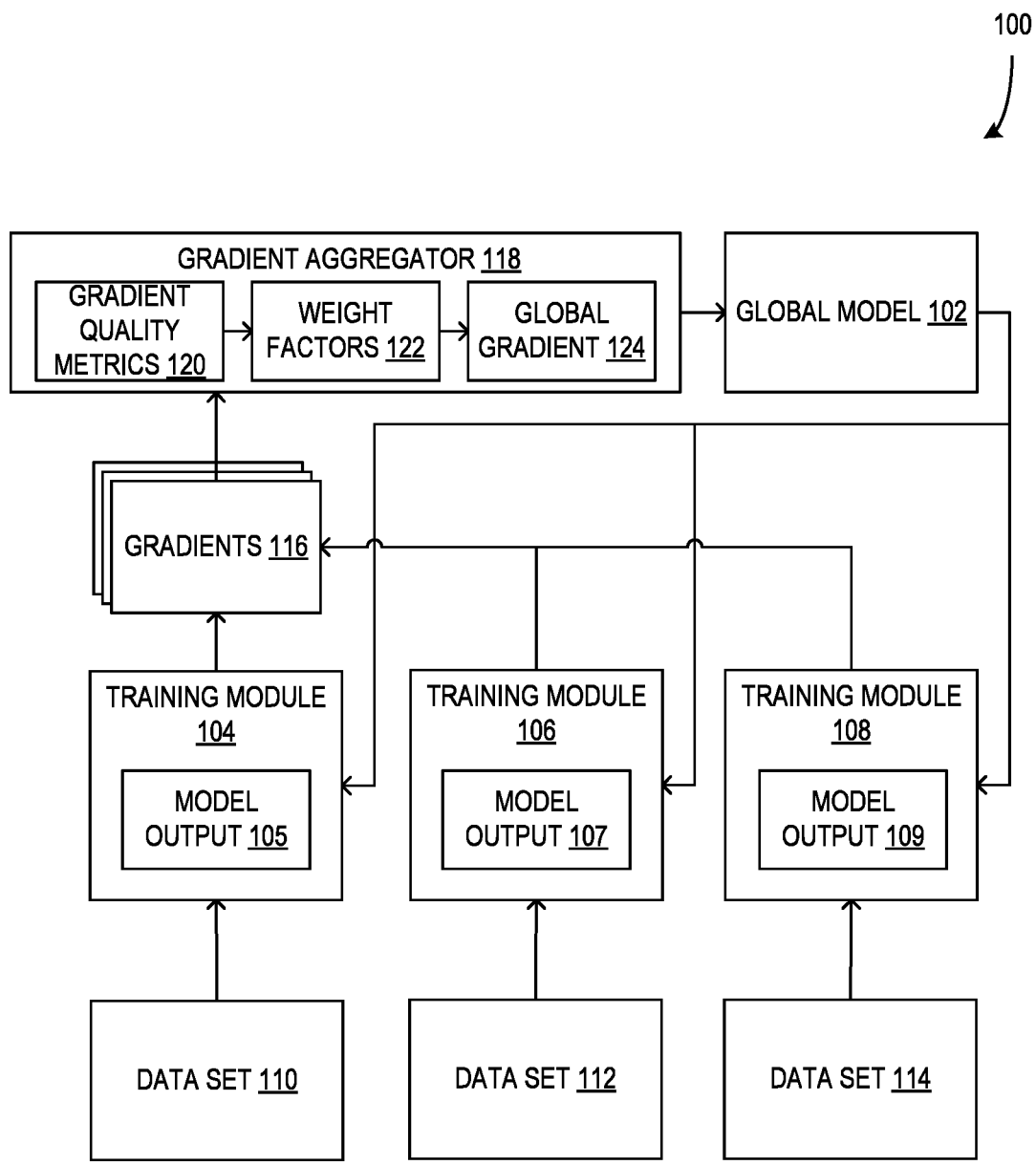
FIG. 1 is a block diagram illustrating a system configured for training a global model based on a plurality of gradients and associated weight factors according to an embodiment.

Aspects of the disclosure provide a computerized method and system for training a global neural network model based on a plurality of data sets. The input to the training process from each data set (e.g., a gradient determined based on the data set) is dynamically weighted and combined with the inputs from all other data sets to update the global neural network model (Dynamic Gradient Aggregation (DGA)), such that data set inputs that will result in improving the model more significantly are weighted to have a larger effect when updating the model than data set inputs that will result in improving the model less significantly. The described method and system automatically generate or obtain gradients associated with each training data set by applying the global model to each training data set. Gradient quality metrics of each gradient are extracted or otherwise determined, and those gradient quality metrics are used to generate a weight factor associated with each gradient. Each weight factor is used to transform the associated gradient into a weighted gradient and all of the weighted gradients are combined to form an aggregated global gradient, such that each gradient affects the resulting global gradient to a degree that is based on the weight factor of the gradient relative to the weight factors of the other gradients. The global model is then updated using the global gradient, such that the resulting updated version of the global model is improved based on training processes performed with all the data sets.

The disclosure addresses the challenges of efficiently performing distributed or federated model training using a plurality of data sets. The DGA process described herein can achieve fast convergence speed and high accuracy in general distributed computer environments, especially if the data sets consist of various types of data with unbalanced distributions. Further, using the DGA process across distributed clients as described herein enables the training of a single global model based on multiple data sets even when the central system cannot directly access the distributed data sets due to privacy issues. By defining specific gradient quality metrics to be used to evaluate gradients obtained based on different training data sets, the disclosure operates in an unconventional manner by dynamically estimating the importance of each data set in training the global model through the generation of weight factors associated with each gradient, thus eliminating any need to manually filter or sort the training data sets. Additionally, the disclosure makes use of a reinforcement learning framework to improve the accuracy of weight factor generation over multiple iterations and/or time, such that the performance of the disclosure at efficiently training the global model is improved overall. Such performance improvements are reflected in the speed with which training the global model converges toward a trained state and in the accuracy of the performance of the global model in the trained state. Additionally, the processing load and/or other resource consumption of the process may be distributed across multiple clients and/or systems (e.g., the training of global model instances to generate gradients) such that processing and resource consumption required by the primary system is reduced and parallel resource usage is enabled. Further, the process of determining how to combine the effects of data sets with respect to updating the global model is entirely automated, reducing and/or eliminating the manual time and effort required in other distributed training methods.

FIG. 1 is a block diagram illustrating a system 100 configured for training a global model 102 based on a plurality of gradients 116 and associated weight factors 122 according to an embodiment. The global model 102 of the system 100 is configured as a model (e.g., a neural network) created and/or trained based on machine learning techniques to perform an action based on data input, such as classifying data or predicting occurrence of future data patterns based on past data. For instance, in some examples, the global model 102 is a model configured to perform automatic speech recognition based on speech data or other audio data provided as input, such that the global model 102 is configured to identify words and/or phrases in the input and provide those identified words and/or phrases as output in the form of text data or the like. The system 100 is configured to train the global model 102 to improve the accuracy and/or efficiency of its performance of its application based on the plurality of data sets 110, 112, and 114 using distributed and/or federated learning techniques.

The system 100 further includes a plurality of training modules 104, 106, and 108 that are used to perform training operations on the global model 102 using the plurality of data sets 110, 112, and 114, respectively. In some examples, the training modules 104, 106, and 108 are configured to apply the global model 102 to the respective data sets 110, 112, and 114 and, as a result of the application, obtain model outputs 105, 107, and 109 associated with the global model 102 and based on those separate data sets. The outputs 105, 107, and 109 of the global model 102 are evaluated with respect to the associated data sets to determine a current accuracy or other performance metric of the global model 102 with respect to the associate data sets (e.g., an error rate or loss of the performance of the global model 102). The training modules 104, 106, and 108 are further configured to analyze the determined accuracy and generate gradients 116 for adjusting the global model 102 to improve its accuracy with respect to the respective data sets (e.g., the gradient 116 generated by the training module 104 is generated to improve the accuracy or other performance metric of the global model 102 with respect to the data set 110 in particular). Thus, each gradient 116 from the training modules 104, 106, and 108 may differ based on differences in the data sets 110, 112, and 114 that affect the accuracy of the performance of the global model 102.

In some examples, the training modules 104-108 are configured to train instances of the global model 102 based on the associated data sets 110-114, such that the model outputs 105-109 include updated model instances of the global model 102 based on the training of the training modules 104-108. Such training may include one or more forms of machine learning processes. For instance, the global model 102 and associated model instances may include one or more the following neural network types without departing from the description herein: an optimized maximum mean discrepancy networks, noise contrastive estimation networks, mixture density networks, neural autoregressive distribution estimators, real-valued neural autoregressive distribution estimators, diffusion process models, variational autoencoders, generative adversarial networks. Additionally, or alternatively, the training modules 104-108, gradient aggregator 118, and/or other components of the system 100 may be configured to train the global model 102 and associated model instances using machine learning techniques without departing from the description (e.g., decision trees, support vector machines, regression analysis models, Bayesian networks, and/or genetic algorithm models). Further, components of the system 100 may be configured to train the global model 102 and associated model instances using one or more types of machine learning algorithms, such as supervised learning algorithms, unsupervised learning algorithms, semi-supervised learning algorithms, reinforcement learning algorithms, self-learning algorithms, feature learning algorithms, sparse dictionary learning algorithms, anomaly detection algorithms, robot learning algorithms, and/or association rules algorithms. In other examples, the system 100 may be configured to use different types of machine learning algorithms without departing from the description herein.

To generate the gradients 116, the training modules calculate differences between the updated model instances and the global model 102 (e.g., differences in model parameters and/or weights that have been updated based on the training process). In some examples, those differences are determined during training by the training module based on comparison of model outputs (e.g., model outputs 105, 107, and 109) to other data associated with the data sets that indicates what accurate outputs of the model should be (e.g., classification labels or 'ground truths'). Such associated data may be provided with the data sets and generated manually (e.g., a person reviews each data entry and provides a correct classification of each data entry) or the data may be generated by some other process that is configured to generate accurate data (e.g., in a speech recognition application, audio data received may be analyzed using a global model instance to generate model output data that indicates words spoken according to the global model instance and the audio data may also be analyzed using another process that spends more time and/or processing to generate more accurate output for comparison with the model output data). However, in other examples, other methods of determining loss gradients or training gradients may be used without departing from the description herein.

In some examples, the data sets 110, 112, and 114 are data sets that include data patterns and/or content to which the global model 102 can be applied. For instance, in an example where the global model 102 is configured to identify locations of people in a video stream, each data set may include one or more different video streams that may or may not include images of people that can be used to train the global model 102. Further, the data sets 110, 112, and 114 may include labels or other indicators of classification of the data (e.g., 'ground truths' associated with the data set or other forms of data that may be compared to model outputs of the global model) that can be used in combination with the model outputs 105, 107, and 109 to determine the accuracy and/or associated loss functions of the global model 102 with respect to each data set. For instance, in an example where the global model 102 is configured to classify each data entry of a data set into one of three classes based on the data of the data entry, each data set 110, 112, and 114 includes both a set of data entries and labels for each data entry that indicate with which of the three classes the data entries are associated. Data sets 110, 112, and 114 and other data sets described herein may contain or otherwise include many different quantities of data without departing from the description herein (e.g., data sets with single entries, data sets with 1000 entries, data sets with 10 million entries, etc.). In some examples, a data set (e.g., data set 110) is a batch portion of data of a larger set of data or a mini-batch portion of data of a larger set of data. Alternatively, or additionally, training global model instances by the training modules based on the data sets as described herein may include the training modules training the global model instances using multiple batch portions of the data sets over multiple iterations of a training process, such that the global model instances are trained and updated several times, each time for separate batch portions of data of the data sets, and upon a training module training a global model instance based on each batch portion of a data set, the resulting trained global model instance has been trained based on the entire data set.

In some examples, the gradients 116 include multi-variable data that describes a vector which indicates a direction in which a loss function of the global model 102 increases the fastest for each model parameter thereof. Because the goal is to improve the performance of the global model 102 through training, the parameters of the global model 102 may be adjusted in the opposite direction of the associated gradient 116 in order to reduce the loss of the global model 102 (e.g., during the training process of the training modules 104-108 when generating model outputs 105-109 that include updated model instances). Alternatively, or additionally, the gradients 116 may include data that describes a vector that is opposite of the vector that indicates the direction in which the loss function of the global model 102 increases the fastest, such that the gradients 116 include data values that may be applied to each parameters of the global model 102 to improve its performance with respect to the specific data set with which each gradient 116 was generated by the training modules 104-108.

The system 100 further includes a gradient aggregator 118 that includes hardware, firmware, and/or software configured to receive the plurality of gradients 116, generate a global gradient 124 based on the received gradients 116, and to update the global model 102 using the global gradient 124. In some examples, the gradient aggregator 118 may include more than one component and the described operations may be split between components of the aggregator 118. Additionally, or alternatively, it should be understood that, in other examples, one or more of the operations described herein may be performed by a component of the system 100 other than the gradient aggregator 118 without departing from the description herein (e.g., the global model 102 may be updated using the global gradient 124 by a component separate from the gradient aggregator 118).

The gradient aggregator 118 is further configured to calculate or otherwise determine weight factors 122 based on gradient quality metrics 120 which are determined or otherwise collected from the gradients 116. In some examples, the gradient quality metrics 120 associated with a specific gradient 116 result in a particular weight factor 122 being applied to the gradient 116 when the plurality of gradients 116 are aggregated into the global gradient 124. As a result, gradients 116 with higher gradient quality metrics 120 are assigned higher weight factors 122, such that data values of the gradients 116 with higher gradient quality metrics 120 affect the data values of the global gradient 124 more substantially. For instance, if a first gradient has higher gradient quality metrics 120 than a second gradient and, as a result, the first gradient is assigned a weight factor of 0.4 and the second gradient is assigned a weight factor of 0.2, the first gradient will affect the data values of the global gradient 124 twice as much as the second gradient when the gradients are aggregated or otherwise combined. The gradient quality metrics 120 and calculation and selection of weight factors 122 for use in generating the global gradient 124 is described in greater detail below with respect to FIG. 3.

While the system 100 includes three data sets 110, 112, and 114 and three training modules 104, 106, and 108, it should be understood that, in other examples, the system 100 may include more, fewer, or different data sets and/or associated training modules without departing from the description herein. For instance, the system 100 may include two data sets with two associated training modules or ten data sets with ten associated training modules. Alternatively, or additionally, the system 100 may include different numbers of data sets and training modules without departing from the description. For instance, in an example, the system 100 may include ten data sets and five training modules, such that each training module applies the global model 102 to two different data sets. Other arrangements and/or organizations of data sets and training modules may be used in the system 100 without departing from the description.

Figure 2:
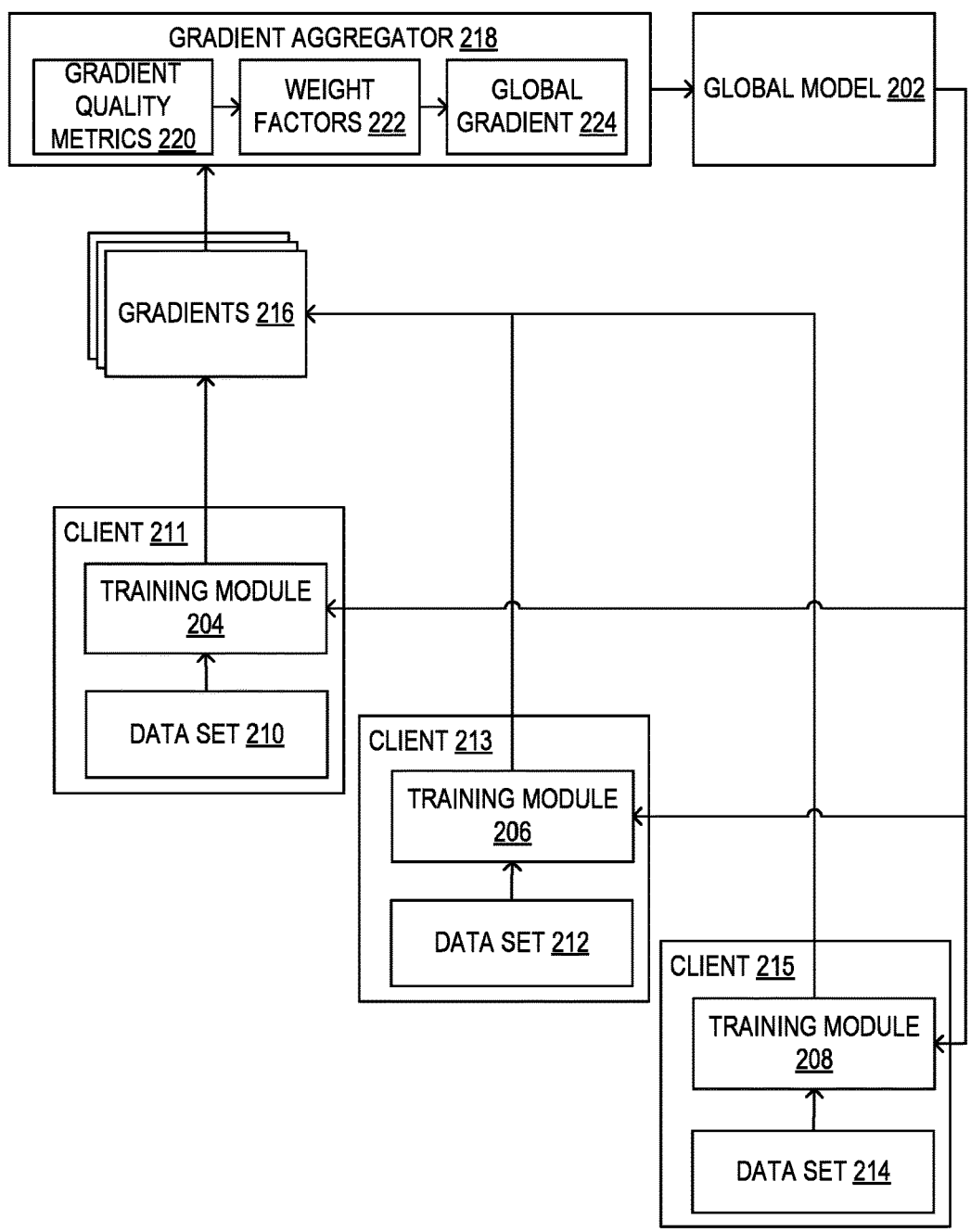
FIG. 2 is a block diagram illustrating a system configured for training a global model based on data sets from a plurality of clients and associated gradients and weight factors according to an embodiment.

FIG. 2 is a block diagram illustrating a system 200 configured for training a global model 202 based on data sets from a plurality of clients 211, 213, and 215 and associated gradients 216 and weight factors 222 according to an embodiment. In some examples, the system 200 and components thereof are substantially the same as system 100 and the components thereof described above with respect to FIG. 1. Further, the system 200 includes clients 211, 213, and 215 which are distributed across multiple different locations. In some examples, the gradient aggregator 218 and global model 202 are maintained in one location and each of the clients 211-215 are in other, separate locations. The components of the system 200 that are located separately may be configured to communicate and/or otherwise interact over a network or networks (e.g., an intranet, the Internet, or the like).

In some examples, each of the clients 211-215 is a separate customer or other entity that has its own data set (e.g., client 211 has a data set 210, client 213 has a data set 212, and client 215 has a data set 214). Because each client is different, the data sets 210-214 may contain differences such as different data patterns, different distributes of data values, or the like. The global model 202 is provided to each of the clients 211-215 and each client trains the global model 202 based on the associated data set using a training module (e.g., training module 204, 206, or 208). The training by each of the clients generates gradients 216 associated with each client/data set and those gradients 216 are aggregated or otherwise combined into a global gradient 224 by the gradient aggregator 218 based on the gradient quality metrics 220 and determined weight factors 222 as described herein. As a result, the global model 202 is adjusted or otherwise updated based on the global gradient 224 that is a combination of gradients 216 from each of the clients 211-215, such that the global model 202 is adjusted based on training operations on each of the data sets of the clients 211-215.

In alternative examples, each client 211-215 trains the global model 202 using respective training modules 204-208 and respective data sets 210-214 to form trained versions of the global model 202 and those trained versions of the global model 202 are sent to the gradient aggregator 218. The gradients 216 may then be identified from the trained versions of the global model 202 by the gradient aggregator 218, rather than being sent to the gradient aggregator 218 from the clients 211-215.

In some examples, each of the clients 211-215 includes at least one computing device at an associated location (e.g., a personal computer, a server, a mobile device) upon which the associated training modules are disposed and/or executed. Further, each of the clients 211-215 stores and/or otherwise includes the associated data sets 210-214. The data sets 210-214 may be stored or located on the same computing devices as the training modules and/or stored or located on different computing devices associated with the clients 211-215 (e.g., each client may include more than one computing device).

Further, in some examples, the communications and/or interactions between the global model 202, the gradient aggregator 218, and the clients 211-215 are performed using data encryption techniques. For instance, the global model 202 may be encrypted prior to it being distributed to each client 211-215 and, upon receiving the global model 202, each client 211-215 is configured to decrypt the global model 202 in order to perform training operations as described. Additionally, or alternatively, the clients 211-215 may be configured to encrypt the trained versions of the global model 202 and/or the identified gradients 216 prior to sending them to the gradient aggregator 218 and, upon receiving gradients 216 and/or trained versions of the global model 202, the gradient aggregator 218 may be configured to decrypt those in order to perform the described operations. Any encryption techniques may be used without departing from the description herein. The described systems and methods include several features that provides enhanced privacy and/or protection of sensitive data, including examples where encryption is used as described. Further, the organization of the system 200 (e.g., the clients 211-215 being separate from the gradient aggregator 218 and the global model 202) and that the clients are enabled to generate gradients 216 locally and provide those gradients to the gradient aggregator 218 in lieu of providing private or otherwise sensitive data sets enables the system 200 to advantageously train the global model based on a variety of different data sets from different sources without compromising the security and/or privacy concerns of those data sets.

Figure 3:
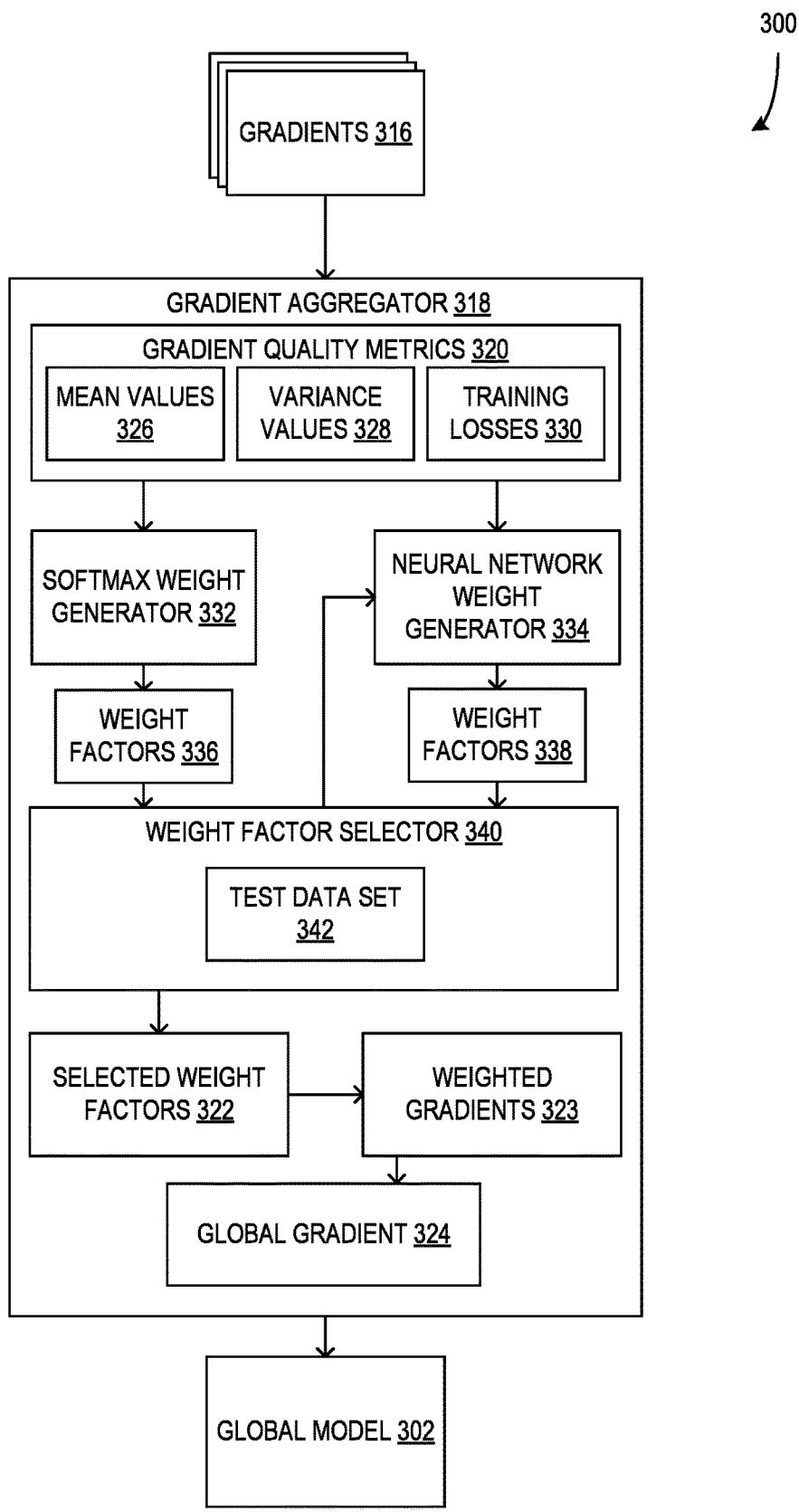
FIG. 3 is a block diagram illustrating a system for combining gradients using selected weight factors into a global gradient for updating a global model according to an embodiment.

FIG. 3 is a block diagram illustrating a system 300 for combining gradients 316 using selected weight factors 322 into a global gradient 324 for updating a global model 302 according to an embodiment. In some examples, the gradient aggregator 318 of system 300 is configured to operate in substantially the same way as the gradient aggregators 118 and 218 in FIGS. 1 and 2, respectively. The gradient aggregator 318 includes hardware, firmware, and/or software configured to receive gradients 316, identify or determine gradient quality metrics 320 from the gradients 316, generate weight factors 336 and/or weight factors 338 based on the gradient quality metrics 320, select a set of weight factors 322 from the generated weight factors, and apply the selected weight factors 322 to form the global gradient 324. The gradient aggregator 318 may be configured to then apply the global gradient 324 to the global model 302 to train and/or update the global model 302 to increase its accuracy or otherwise improve the performance of the global model 302.

In some examples, the gradient quality metrics 320 that are determined or otherwise identified with respect to the gradients 316 include at least one of mean values 326 of the gradients 316 (e.g., metrics determined based on comparing an individual gradient to a mean value of all the gradients combined while back-propagated through the network), variance values 328 of the gradients 316 (e.g., metrics determined based on comparing an individual gradient to a variance value of all the gradients combined while back-propagating through the network), and/or training losses 330 associated with the gradients 316 (e.g., a metric based on how far model output is from the true labels or state of the data set). In some examples, one type of gradient quality metric is used for each gradient 316 (e.g., the training losses 330 of each gradient 316 is use to evaluate the relative quality of the gradients 316), while in other examples, more than one type of gradient quality metric is combined for use in evaluating the gradients 316 (e.g., a combination of the means values 326, variance values 328, and training losses 330 of each gradient 316 are used to evaluate the relative quality of the gradients 316). In other examples, more, fewer, or different types of gradient quality metrics without departing from the description herein.

The gradient aggregator 318 includes a softmax weight generator 332 that is configured to generate weight factors 336 from the gradient quality metrics 320 based on softmax functions and a neural network weight generator 334 configured to generate weight factors 338 from the gradient quality metrics 320 based on a trained neural network model. In other examples, the gradient aggregator 318 may be configured to include only one weight generator (e.g., only the softmax weight generator 332 or only the neural network weight generator 334) and those weight factors 336 or 338 are then automatically used as the selected weight factors 322 as described herein. Alternatively, the gradient aggregator 318 may be configured to include more and/or different types of weight generators in addition to or in place of the softmax weight generator 332 and the neural network weight generator 334 without departing from the description. In such examples, each weight generator may generate a set of weight factors and one of those sets of weight factors may be selected for use in the global gradient 324 as described herein.

In some examples, the softmax weight generator 332 is configured to use training losses 330 of the gradients 316 for generating the weight factors 336. For instance, determining a weight factor $\alpha^{(j)}$ for each gradient j with a training loss $\mathcal{L}_T^{(j)}$ may be determined according to the following formula, wherein the effect of each training loss $\mathcal{L}$ is also regulated by a parameter $\alpha$:

$$\alpha^{(j)} = \frac{\exp(-\alpha \mathcal{L}_T^{(j)})}{\Sigma_i \exp(-\alpha \mathcal{L}_T^{(i)})}$$

Using this formula, weight factors for gradients are generated such that gradients 316 with similar magnitudes will be assigned weight factors of similar values. Such alignment of gradients when combined into the global gradient 324 may be advantageous with respect to the convergence speed of training the global model 302. Gradients with higher training losses may indicate how much the associated data set mismatches the current global model 302, which may be due to outliers in the data sets and/or other bad data qualities, such as noisy data. Since the softmax function considers all available gradients 316 when calculating weight factors, it results in de-emphasizing those gradients with larger values of corresponding training losses.

The gradient aggregator 318 further includes a neural network weight generator 334 that is configured to receive the gradient quality metrics 320 of the gradients 316, apply a neural network model to the gradient quality metrics 320, and generate weight factors 338 for each of the gradients 316 based on the output of the neural network model. Further, the neural network weight generator 334 may be configured to train the neural network model to improve its accuracy and/or performance at generating the weight factors 338 based on feedback, such as feedback from the weight factor selector 340 as described herein. In some examples, the neural network weight generator 334 uses the same gradient quality metrics 320 as the softmax weight generator 332 to generate weight factors 338 and 336, respectively. Alternatively, the neural network weight generator 334 is configured to use more or different gradient quality metrics 320 to generate weight factors 338 than the gradient quality metrics 320 used by the softmax weight generator 332 to generate the weight factors 336 (e.g., the softmax weight generator 332 is configured to use the training losses 330 of each gradient 316 and the neural network weight generator 334 is configured to use a combination of the training losses 330 and the mean values 326 of each gradient 316). In other examples, more, fewer, or different types of weight generators may be configured to use more, fewer, or different types or combinations of types of gradient quality metrics 320 without departing from the description herein.

For instance, in some examples, the training process of the network is based on reinforcement learning (RL) where the action $\alpha_t^{(j)}$ are predicted from the results they incur (e.g., the character error rate (CER) in an automated speech recognition (ASR) application) on the validation set in every time step t. The RL network learns the sequences of the actions that leads an agent to maximize its objective function. The reward policy (e.g., the function by which the RL network is adjusted based on feedback) is based on the performance indicated by the results (e.g., the environment, the action $\alpha_t^{(j)}$ is the inferred weights, and state are the input features). The policy agent of the process is a network that infers or otherwise determines the weight factors 338 based on the input state. In other examples, other techniques besides reinforcement learning may be used to train the neural network without departing from the description herein, such as machine learning techniques described above with respect to the training modules 104-108.

The gradient aggregator 318 includes a weight factor selector 340 that is configured to receive multiple sets of weight factors (e.g., weight factors 336 and weight factors 338), test the received sets of weight factors using a test data set 342, and, based on the testing, output a set of selected weight factors 322. In some examples, the weight factor selector 340 is configured to generate aggregated or otherwise combined global gradients based on each set of weight factors 336 and 338, and update instances of the global model 302 using the generated global gradients for each set of weight factors. Each updated global model instance may then be applied to the test data set 342 and the results are evaluated for accuracy and/or other performance metrics. Based on identifying which updated global model instance has the best performance on the test data set, the weight factor selector 340 selects one of the sets of weight factors as a set of selected weight factors 322 for use in generating a global gradient 324.

Further, the weight factor selector 340 may be configured to provide feedback to the neural network weight generator 334 based on which set of weight factors is selected as the selected weight factors 322. In examples where the weight factors 336 perform better than the weight factors 338 during the testing of the weight factor selector 340, the feedback provided to the neural network weight generator 334 may include data that may be used by the generator 334 to update and improve the performance of the neural network model when generating future weight factors 338. For instance, in ASR tasks, the CER is estimated on two different versions of the model, using either the inferred weight factors 338 from the neural network weight generator 334 or the training loss-based weight factors 336 from the softmax weight generator 332. Depending on the comparative results, the feedback is provided to the neural network weight generator 334, and the associated neural network model is updated based on the feedback.

After the weight factor selector 340 selects the selected weight factors 322 from the available sets of weight factors 336 and 338, the gradient aggregator 318 is configured to generate a global gradient 324 based on the selected weight factors 322 and the gradients 316 provided as input to the gradient aggregator 318. In some examples, generating the global gradient 324 includes applying, to each gradient 316, the selected weight factor 322 that was generated with respect to the gradient 316 to form weighted gradients 323 (e.g., multiplying the gradient 316 by the weight factor 322) and then combining or aggregating all of the weighted gradients 323 to form the global gradient 324 (e.g., summing all of the weighted gradients 323 and dividing the result by a quantity of gradients to achieve average gradient values). In some examples, the gradients 316 include data values for one or more parameters of the global model 302 that can be adjusted to alter the performance of the global model 302 and, in such examples, each of the data values of a gradient 316 may be adjusted or otherwise altered by the application of a weight factor to the gradient 316. Further, in the generation of the global gradient 324, each of the data values of the global gradient 324 may be calculated separately based on the corresponding data values of the weighted gradients 323 that result from the application of the selected weight factors 322 to the gradients 316. For instance, to calculate a data value A of the global gradient 324, the data value A's of each of the weighted gradients 323 may be added together and then the result may be divided by the total quantity of weighted gradients 323, such that the data value A of the global gradient 324 is essentially an average of all the data value A's of the weighted gradients 323. In other examples, other methods of combining or aggregating the gradients 316 using the selected weight factors 322 may be used to generate the global gradient 324 without departing from the description herein.

In some examples, the gradient aggregator 318 is configured to apply the global gradient 324 to the global model 302 or otherwise provide the global gradient 324 to another entity for application to the global model 302, whereby the global model 302 is updated based on the global gradient 324. In examples where the global gradient 324 includes a plurality of data values and each data value is associated with a parameter of the global model 302 that can be adjusted to change the performance of the global model 302, the data values of the global gradient 324 may be added to or otherwise combined with the current parameters of the global model 302 as a way of updating those parameters to form an updated global model 302. In such examples, some of the data values of the global gradient 324 may be positive values while others may be negative values, such that some parameters of the global model 302 may be increased while other parameters of the global model 302 may be decreased. In other examples, the global gradient 324 may be applied to the global model 302 using other methods or processes without departing from the description herein.

Additionally, or alternatively, the system 300 may further be configured to apply additional training processes on the global model 302 after the global gradient 324 has been applied to ensure that the updated global model 302 remains compatible with the original tasks which it is intended to perform. In such examples, the system 300 may include an additional held-out data set upon which the global model 302 can be trained and, after the global model 302 has been updated based on the global gradient 324, the updated version of the global model 302 may be trained on the held-out data according to machine learning techniques. This additional training process may result in a gentle update to the global model 302 that may prevent or reduce substantial divergence of the global model 302 away from the task of interest based on the gradients 316 being based on unbalanced data sets or other related issues.

Figure 4:
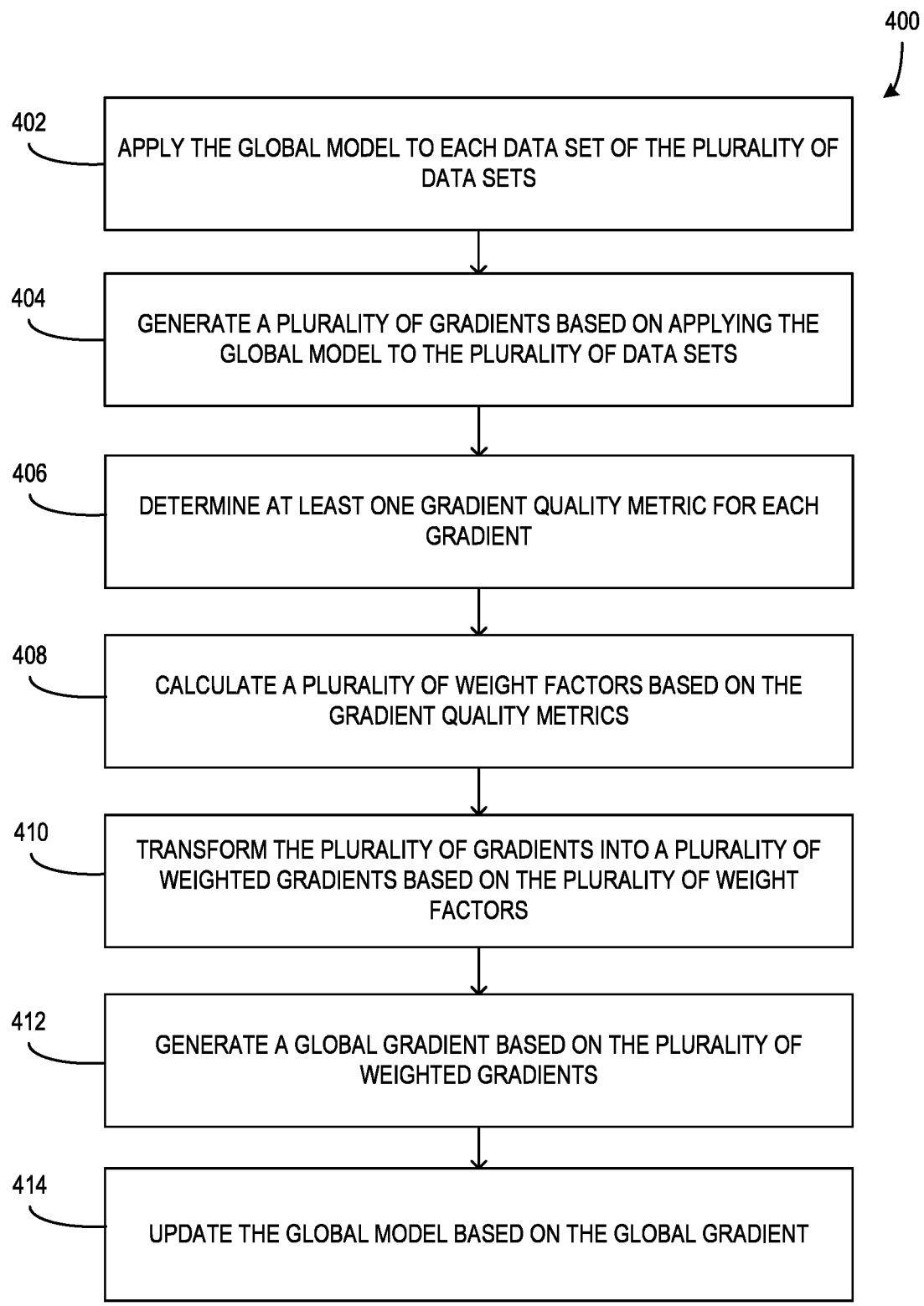
FIG. 4 is a flow chart illustrating a computerized method for training a global model based on a plurality of gradients and associated weight factors according to an embodiment.

FIG. 4 is a flow chart illustrating a computerized method 400 for training a global model based on a plurality of gradients and associated weight factors according to an embodiment. In some examples, the method 400 is executed or otherwise implemented on a system such as systems 100, 200, and/or 300 of FIGS. 1, 2, and 3, respectively. At 402, the global model is applied to each data set of a plurality of data sets. In some examples, the application of the global model to each data set includes training the global model on each data set to form a plurality of global model instances, each of which has been trained on a data set of the plurality of data sets. As a result of the training, each global model instance may include updated parameters and/or weights within the model instance that represent differences in how each global model instance performs when applied to a data set. Further, it should be understood that training a global model instance based on a data set of the plurality of data sets may include applying the global model to the data set to obtain model output (e.g., model output 105, 107, and 108), evaluating the accuracy of the obtained model output by comparing it to the label data of the data set, and adjusting the global model to form a global model instance, which may include adjusting or otherwise changing parameters of the global model instance, to improve the accuracy of the global model instance with respect to the data set.

At 404, a plurality of gradients is generated based on applying the global model to the plurality of data sets. In some examples, a gradient is generated based on each data set of the plurality of data sets. Generating a gradient may include comparing the global model to the updated global model instance associated with the data set to identify differences between the global model and the global model instance. The generated gradient may be configured to include data values that reflect differences between each parameter of the global model and corresponding parameters of the updated global model instance.

At 406, at least one gradient quality metric is determined for each gradient of the plurality of gradients. In some examples, the determined gradient quality metrics include mean values of the gradients, variance values of the gradients, and/or training loss values of the gradients, as described herein. Additionally, or alternatively, the gradient quality metrics may include single types of metrics or combinations of multiple types of metrics. Further, in examples where multiple times of metrics are combined, each type of quality metric may be weighted to influence the degree to which each type of metric affects the process of calculating weight factors as described herein (e.g., mean value metrics are weighted with a 0.4 weight and training loss metrics are weighted with a 0.6 weight, such that the training loss values affect the process more than the mean values).

At 408, a plurality of weight factors is calculated based on the gradient quality metrics. In some examples, the gradient quality metrics of each gradient are compared to the general set of gradient quality metrics of the plurality of gradients to calculate a weight factor for the gradient relative to the other gradients of the plurality of gradients. The process of calculating weight factors is described in greater detail with respect to FIG. 3 and FIG. 6 herein.

At 410, the plurality of gradients is transformed into a plurality of weighted gradients based on the plurality of weight factors. In some examples, the weight factor associated with a gradient of the plurality of gradients is applied to the gradient by multiplying the data values of the gradient by the weight factor, such that the data values of the gradient are adjusted by the weight factor. In this way, the degree to which the gradient affects the generation of the global gradient is adjusted based on the weight factor.

At 412, a global gradient is generated based on the plurality of weighted gradients. In some examples, generating the global gradient includes a process of combining all the weighted gradients. For instance, each weighted gradient may be added together based on corresponding data values of the gradients and then the total values may be divided by a total quantity of gradients or otherwise normalized to form the global gradient.

At 414, the global model is updated based on the global gradient. In some examples, updating the global model includes adjusting or otherwise changing the parameters of the global model by applying corresponding data values of the global gradient to the parameters of the global model. For instance, parameter A of the global model may be increased to an adjusted value by adding the corresponding data value of the global gradient to the value of parameter A. Alternatively, or additionally, parameters may be decreased or adjusted in other ways based on the global gradient without departing from the description herein.

Further, in some examples, training the global model based on a data set may include training the global model using the data set or training the global model using the data set for multiple iterations, such that changes to the global model due to the training represent multiple steps made toward improving the accuracy of the global model with respect to the data set with which the global model is being trained. This iterative training process may be used as part of the process to generate gradients and/or otherwise to train the global model as described herein.

Figure 5:
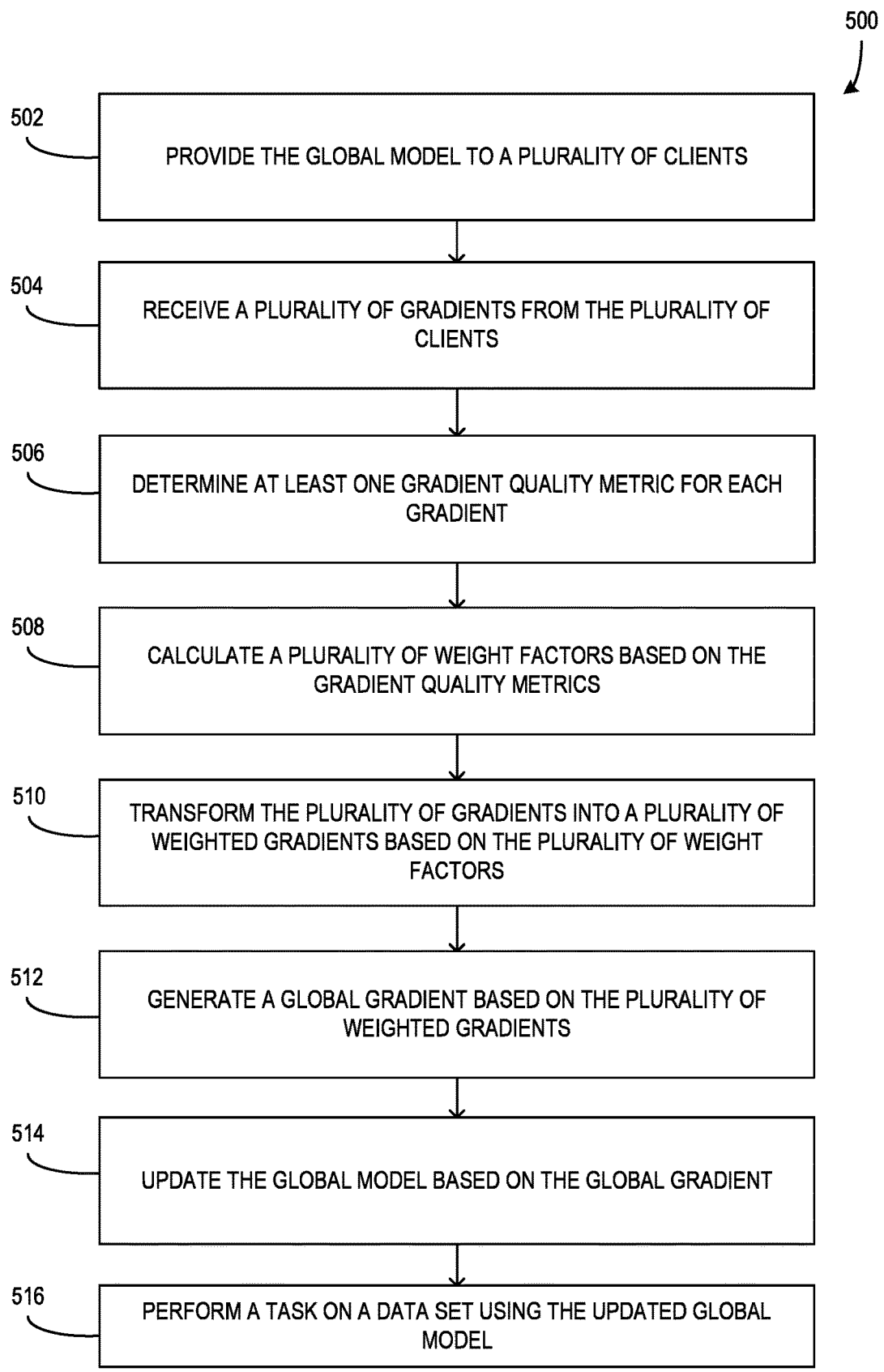
FIG. 5 is a flow chart illustrating a computerized method for training a global model based on data sets from a plurality of clients and associated gradients and weight factors according to an embodiment.

FIG. 5 is a flow chart illustrating a computerized method 500 for training a global model based on data sets from a plurality of clients and associated gradients and weight factors according to an embodiment. In some examples, the method 500 is executed or otherwise implemented on a system such as systems 100, 200, and/or 300 of FIGS. 1, 2, and 3, respectively. At 502, the global model is provided to a plurality of clients. In some examples, each client of the plurality of clients is in a separate physical location and/or otherwise separate from other clients and connected to the system providing the global model via a network connection (e.g., an intranet, the Internet, or other network connection). Further, each client of the plurality of clients may include a data set and training module configured for training the global model based on the data set, such that an updated global model instance is generated or otherwise created that has been trained on the data set for improved performance when the updated global model instance is applied to data of the client.

At 504, a plurality of gradients is received from the plurality of clients. In some examples, each client of the plurality of clients sends a gradient to the system that provided the global model via a network connection or other communication interface between the client and the system. Each received gradient may be configured to indicate differences between the current global model and an updated global model instance that was trained based on a data set that is specific to the client from which the gradient has been received.

At 506, at least one gradient quality metric is determined for each gradient of the plurality of gradients and, at 508, a plurality of weight factors is calculated based on the gradient quality metrics. The plurality of gradients is transformed into a plurality of weighted gradients based on the plurality of weight factors at 510 and, at 512, a global gradient is generated based on the plurality of weighted gradients. At 514, the global model is updated based on the global gradient. In some examples, the process from 506-514 is performed in substantially the same manner as process of method 400 from 406-414 described above.

At 516, a task is performed on a data set using the updated global model. In some examples, the task includes at least one of classifying data entries of the data set, identifying patterns in the data set, or otherwise analyzing the data set and providing output based on the analysis. Further, in some examples, the updated global model is configured to perform the task on the data set with improved accuracy and/or other improved performance metrics compared to the original version of the global model.

Further, in some examples, after the global model is updated based on the global gradient, additional training processes may be applied to the updated global model to ensure that the updated global model remains compatible with the original tasks which it is intended to perform. In such examples, an additional held-out data set may be used to train the updated global model according to machine learning techniques. This additional training process may result in a gentle update to the global model that may prevent or reduce substantial divergence of the global model away from tasks of interest based on the gradients being based on unbalanced data sets or other related issues.

Additionally, or alternatively, the output of the updated global model based on performing the task on the data set at 516 may be used to generate a gradient associated with the data set. The generated gradient may then be incorporated into a future plurality of gradients (e.g., at 504) and used to iteratively train the global model as described herein during its use on data sets at runtime.

In some examples, a client of the plurality of clients accesses a data set to which the global model is to be applied (e.g., an incoming data set flagged to be analyzed) and the client applies the global model to the data set. As described herein, the global model is configured to perform a task on the accessed data set and provide model output based on performing the task. The global model is then trained based on the data set and the provided model output and a gradient associated with the data set is generated based on the training of the global model. The generated gradient may be provided to the source of the global model (e.g., the gradient aggregator 318) and the source of the global model may use the gradient as described herein to train the global model (e.g., including the gradient in a plurality of gradients, calculating weight factors associated with the gradients, and updating the global model based on the plurality of gradients and weight factors). The client may the receive the updated global model from the source, such that the client is enabled to use the updated global model to perform the task on other data sets.

Additionally, or alternatively, generating the gradient by the client may include comparing a first version of the global model from prior to training the global model to a second version of the global model from after training the global model and generating the gradient based on differences in the model parameters between the first version and second version. Further, training the global model based on the data set may include identifying data associated with the data set that indicates what accurate outputs of the global model should be and comparing the provided model output to the identified data. In some examples, the associated data may include at least one of manually defined classification labels or other "ground truths" or a set of classification labels or other data generated based on another process.

In further examples, after the client receives the updated global model, the client may apply the updated global model to the data set to obtain updated model output and use that updated model output instead of the initially provided model output.

Additionally, or alternatively, the data set to which the client applies the global model is a batch portion of a larger set of data which includes a plurality of batch portions. The client may be configured to apply the global model to each batch portion of the plurality of batch portions, train the global model based on each batch portion and the associated model outputs, generate a gradient associated with each batch portion based on training the global model, and provide the generated gradient associated with each bath portion to the source of the global model as described herein.

Figure 6:
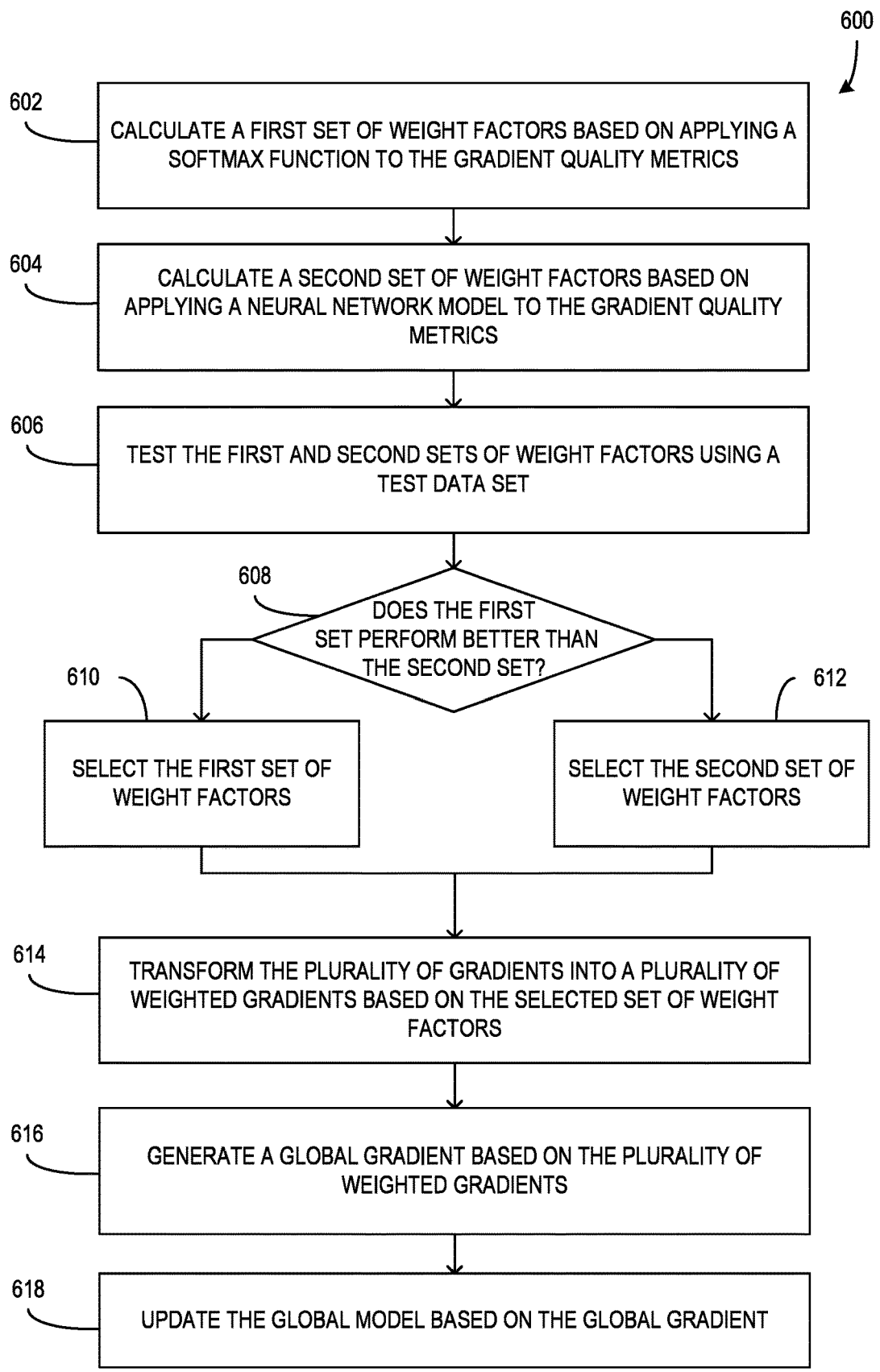
FIG. 6 is a flow chart illustrating a computerized method for combining gradients using selected weight factors into a global gradient for updating a global model according to an embodiment.

FIG. 6 is a flow chart illustrating a computerized method 600 for combining gradients using selected weight factors into a global gradient for updating a global model according to an embodiment. In some examples, the method 600 is executed or otherwise implemented on a system such as systems 100, 200, and/or 300 of FIGS. 1, 2, and 3, respectively. Further, the method 600 may be performed as part of other methods such as methods 400 and/or 500 of FIGS. 4 and 5, respectively. For instance, 602-612 of method 600 may be performed as a portion of a process of calculating weight factors at 408 or 508 of methods 400 or 500, respectively. At 602, a first set of weight factors is calculated based on applying a softmax function to the gradient quality metrics of the plurality of gradients and at 604, a second set of weight factors is calculated based on applying a neural network model to the gradient quality metrics as described above with respect to FIG. 3. In some examples, each of the first set of weight factors and the second set of weight factors includes a calculated weight factor for each gradient of the plurality of gradients.

At 606, the first and second sets of weight factors are tested using a test data set. In some examples, testing the first and second sets of weight factors includes updating a first instance of the global model using the first set of weight factors and updating a second instance of the global model using the second set of weight factors. The first and second instances of the global model are then applied to the test data set and a first and second set of model outputs are generated, wherein the first set of model outputs is based on the first set of weight factors and the second set of model outputs is based on the second set of weight factors. Each of the first and second sets of model outputs are compared to label data (e.g., data indicating classifications of data entries in the test data set) of the test data set. That comparison yields an accuracy metric and/or other performance metrics associated with the first and second sets of weight factors.

At 608, if the first set of weight factors performs better (e.g., more accurately) than the second set of weight factors based on the testing using the test data set, the process proceeds to 610. Alternatively, if the first set of weight factors does not perform better than second set of weight factors (e.g., the second set of weight factors performs better than the first set of weight factors), the process proceeds to 612. In some examples, the determination of which set of weight factors performs better is based on a comparison of the accuracy metric or other performance metric of the first set of weight factors to the equivalent metric of the second set of weight factors (e.g., if the first set of weight factors performs at 96% accuracy and the second set of weight factors performs at 92% accuracy, the first set of weight factors performs better than the second set of weight factors).

If the first set of weight factors performs better than the second set at 608, the first set of weight factors is selected at 610. Alternatively, if the second set of weight factors performs better than the first set of weight factors, the second set of weight factors is selected at 612. In some examples, if both sets of weight factors perform substantially the same, the first or the second set of weight factors may be selected based on a defined default selection setting.

Further, in some examples, the neural network model used to calculate the second set of weight factors at 604 is trained or otherwise updated based on the compared performances of the first and second set of weight factors at 608. For instance, if the first set of weight factors performs better than the second set of weight factors, feedback data may be provided based on that comparison that may be used to improve the performance of the neural network model such that its performance is improved as described herein. Alternatively, if the second set of weight factors performs better than the first set of weight factors, no change may be made to the neural network model, as it already outperforms the softmax function that is used to generate the first set of weight factors. Alternatively, in such examples, feedback data may be provided based on the comparison that may be used to reinforce the performance of the neural network model to further improve its performance.

At 614, the plurality of gradients is transformed into a plurality of weighted gradients based on the selected set of weight factors and a global gradient is generated based on the plurality of weighted gradients at 616. The global gradient is then used to update the global model at 618. In some examples, the process of 614-618 is performed in substantially the same manner as 410-414 in FIG. 4 and/or 510-514 in FIG. 5.

Additional Example Scenarios

Aspects of the disclosure enable various additional scenarios, such as next described.

In an example, a system is configured as described herein to send copies of a global model, which is configured to perform ASR tasks on audio data, to three clients, Client A, Client B, and Client C. Each of the clients receives the sent copy of the global model. Client A has a data set A that is audio data derived from the operations of Client A, Client B has a data set B that is audio data derived from the operations of Client B, and Client C has a data set C that is audio data derived from the operations of Client C.

Each client uses a training module to train the received global model using the respective data sets and the result of the training is three separate updated global model instances, each of which is associated with the client and data set by which it was trained. Each updated global model instance is compared to the original global model copy to generate a gradient associated with the client, such that Client A generates a gradient A, Client B generates a gradient B, and Client C generates a gradient C. Each generated gradient may differ due to differences in the associated data sets which affected the degree and way in which the global model was trained and/or updated into updated model instances.

Each client sends the generated gradients back to the system, providing the gradients to a gradient aggregator component as described herein. In order to send the generated gradients, each client encrypts the gradient using an encryption technique for which the system of the gradient aggregator is configured, such that, when the system receives the encrypted gradients, the system is configured to decrypt the encrypted gradients so that the gradient aggregator can perform operations thereon.

The gradient aggregator receives the gradients and obtains or otherwise determines gradient quality metrics associated with each gradient, such that the gradient aggregator is enabled to compare the quality of the gradients (e.g., the degree to which each gradient can be used to improve the global model, relative to other gradients received). Based on the determined gradient quality metrics, the gradient aggregator generates weight factors for each gradient. As described herein, the gradient aggregator applies a softmax function to the gradient quality metric of each gradient in relation to the gradient quality metrics of all three gradients, which provides a separate weight factor for each gradient. Further, the gradient aggregator applies a neural network model to the gradient quality metrics of the three gradients and the neural network model produces a second set of weight factors including a weight factor for each gradient.

The gradient aggregator then compares the performance of the set of weight factors generated with the softmax function to the set of weight factors generated by the neural network model and selects the set of weight factors that performs the best between the two sets. The performance of each set of weight factors is measured by applying the set of weight factors to the gradients, updating a global model instance with the weighted gradients, applying the updated global model instance to a test data set, and determining the accuracy or other performance metric of the global model instance based on that application.

The gradient aggregator then applies the selected weight factors to the gradients to form weighted gradients and generates a global gradient based on the weighted gradients. The global gradient is applied to the global model to form an updated global model as described herein.

Exemplary Operating Environment

Figure 7:
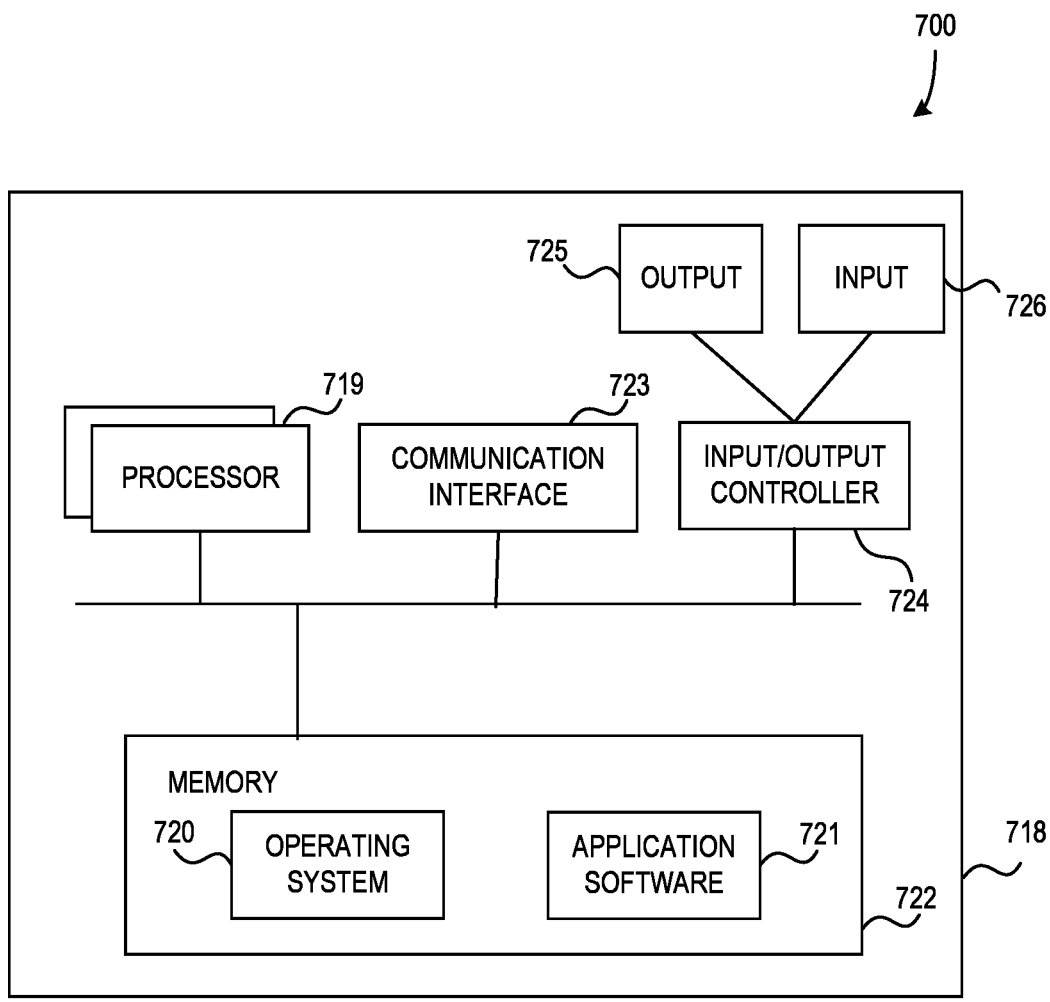
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, training a global model based on gradients and weight factors associated with a plurality of data sets as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for training a global model based on a plurality of data sets comprises: at least one processor; and at least one memory comprising computer program code, the at least one memory and the computer program code configured to, with the at least one processor, cause the at least one processor to: apply the global model to each data set of the plurality of data sets; generate a plurality of gradients based on applying the global model to each data set of the plurality of data sets, wherein an individual gradient of the plurality of gradients is generated based on an individual data set of the plurality of data sets; determine a plurality of gradient quality metrics, at least one gradient quality metric for each individual gradient of the plurality of gradients, the at least one gradient quality metric indicating a degree to which the individual gradient can be used to improve the global model; calculate a plurality of weight factors using the determined plurality of gradient quality metrics, the plurality of weight factors including an individual weight factor for each individual gradient of the plurality of gradients; transform the plurality of gradients into a plurality of weighted gradients based on the calculated plurality of weight factors; generate a global gradient based on the plurality of weighted gradients; and update the global model based on the global gradient, wherein the updated global model, when applied to the individual data set, performs a task based on the individual data set and provides model output based on performing the task.

An example computerized method for training a global model based on a plurality of clients comprises: providing, by a processor, the global model to a plurality of clients; receiving, by the processor, a plurality of gradients from the plurality of clients; determining, by the processor, a plurality of gradient quality metrics, at least one gradient quality metric for each individual gradient of the plurality of gradients, the at least one gradient quality metric indicating a degree to which the individual gradient can be used to improve the global model; calculating, by the processor, a plurality of weight factors using the determined plurality of gradient quality metrics, the plurality of weight factors including an individual weight factor for each individual gradient of the plurality of gradients; transforming, by the processor, the plurality of gradients into a plurality of weighted gradients based on the calculated plurality of weight factors; generating, by the processor, a global gradient based on the plurality of weighted gradients; and updating, by the processor, the global model based on the global gradient, wherein the updated global model, when applied to an individual data set, performs a task based on the individual data set and provides model output based on performing the task.

One or more non-transitory computer storage media having computer-executable instructions for applying a global model to a data set that, upon execution by a processor, cause the processor to at least: access the data set; apply the global model to the data set, whereby the global model performs a task on the accessed data set and provides model output based on performing the task; train the global model based on the data set and the provided model output; generate a gradient associated with the data set based on training the global model; provide the generated gradient to a source of the global model, wherein the source of the global model is configured to: include the generated gradient in a plurality of gradients associated with the global model; calculate a plurality of weight factors, the plurality of weight factors including an individual weight factor for each individual gradient of the plurality of gradients; and update the global model based on the plurality of gradients and plurality of weight factors; and receive an updated global model from the source of the global model.

Alternatively, or in addition to the other examples described herein, examples include any combination of the following:

wherein the plurality of gradient quality metrics includes at least one of gradient mean values, gradient variance values, or training loss values associated with applying the global model to each data set of the plurality of data sets.

wherein calculating the plurality of weight factors includes applying, by the processor, a softmax function to the at least one gradient quality metric of each individual gradient of the plurality of gradients, wherein the individual weight factor of the plurality of weight factors for each individual gradient of the plurality of gradients is based on a result of applying the softmax function to the at least one gradient quality metric of the individual gradient.

wherein calculating the plurality of weight factors further includes applying, by the processor, a weight factor neural network model to the at least one gradient quality metric of each individual gradient of the plurality of gradients, wherein the individual weight factor of the plurality of weight factors for each individual gradient of the plurality of gradients is based on a result of applying the weight factor neural network model to the at least one gradient quality metric of the individual gradient.

wherein the plurality of weight factors includes a first set of weight factors based on applying the softmax function to the at least one gradient quality metric of each individual gradient of the plurality of gradients and a second set of weight factors based on applying the weight factor neural network model to the at least one gradient quality metric of each individual gradient of the plurality of gradients; wherein the computerized method further includes: testing, by the processor, the first set of weight factors and the second set of weight factors based on a test data set; and selecting, by the processor, a set of weight factors from the first set of weight factors and the second set of weight factors based on the testing; and wherein transforming the plurality of gradients into a plurality of weighted gradients based on the calculated plurality of weight factors includes transforming the plurality of gradients into a plurality of weighted gradients based on the selected set of weight factors.

further comprising training, by the processor, the weight factor neural network model based on the testing of the first set of weight factors and the second set of weight factors based on the test data set.

further comprising, based on updating the global model based on the global gradient, training, by the processor, the updated global model using a held-out data set associated with the task, wherein divergence away from the task caused by updating the global model is reduced.

wherein generating the gradient associated with the data set includes comparing a first version of the global model from prior to training the global model to a second version of the global model from after training the global model and generating the gradient based on differences in model parameters between the first version and second version.

wherein training the global model based on the data set includes: identifying data associated with the data set that indicates what accurate outputs of the global model should be; and comparing the provided model output to the identified data.

wherein the identified data includes at least one of manually defined classification labels of the data set or classification labels of the data generated based on another process.

wherein the computer-executable instructions, upon execution by a processor, further cause the processor to at least apply the updated global model to the data set, whereby the updated global model performs a task on the accessed data set and provides model output based on performing the task.

wherein the accessed data set is a batch portion of a larger set of data divided into a plurality of batch portions; and wherein the computer-executable instructions, upon execution by a processor, further cause the processor to at least: apply the global model to each batch portion of the plurality of batch portions whereby the global model performs a task on each batch portion and provides model output associated with each batch portion; train the global model based on each batch portion and the associated model output; generate a gradient associated with each batch portion based on training the global model; and provide the generated gradient associated with each batch portion to a source of the global model.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for applying, by a processor, the global model to each data set of the plurality of data sets; exemplary means for generating, by the processor, a plurality of gradients based on applying the global model to each data set of the plurality of data sets, wherein an individual gradient of the plurality of gradients is generated based on an individual data set of the plurality of data sets; exemplary means for determining, by the processor, a plurality of gradient quality metrics, at least one gradient quality metric for each individual gradient of the plurality of gradients, the at least one gradient quality metric indicating a degree to which the individual gradient can be used to improve the global model; exemplary means for calculating a plurality of weight factors using the determined plurality of gradient quality metrics, the plurality of weight factors including an individual weight factor for each individual gradient of the plurality of gradients; exemplary means for transforming, by the processor, the plurality of gradients into a plurality of weighted gradients based on the calculated plurality of weight factors; exemplary means for generating, by the processor, a global gradient based on the plurality of weighted gradients; and exemplary means for updating, by the processor, the global model based on the global gradient, wherein the updated global model, when applied to the individual data set, performs a task based on the individual data set and provides model output based on performing the task.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for training an automated speech recognition (ASR) neural network model, the system comprising:
at least one processor; and
at least one memory comprising computer program code, the at least one memory and the computer program code configured to, with the at least one processor, cause the at least one processor to:
apply the ASR neural network model to each data set of a plurality of data sets representing speech data;
generate a plurality of gradients based on applying the ASR neural network model to each data set of the plurality of data sets, wherein an individual gradient of the plurality of gradients is generated based on an individual data set of the plurality of data sets;

determine, prior to updating the ASR neural network model, a plurality of gradient quality metrics for the plurality of gradients;

calculate, prior to updating the ASR neural network model, initial weight factors for the plurality of gradients based on the plurality of gradient quality metrics such that gradients generated from undistorted speech are assigned higher initial weight factors than gradients generated from distorted speech in advance of initial training processes associated with the plurality of data sets;

transform, prior to updating the ASR neural network model, the plurality of gradients into a plurality of weighted gradients based on the initial weight factors;

generate, prior to updating the ASR neural network model, a global gradient based on an aggregation of the plurality of weighted gradients; and update the ASR neural network model based on the global gradient such that the resulting updated ASR neural network model is based on the initial training processes associated with the plurality of data sets, wherein the updated ASR neural network model, when applied to the individual data set, performs a task for ASR based on the individual data set and provides model output based on performing the task.

2. The system of claim 1, wherein calculating the initial weight factors includes applying a softmax function to at least one gradient quality metric for each individual gradient of the plurality of gradients, wherein each individual weight factor of the initial weight factors for each individual gradient of the plurality of gradients is based on a result of applying the softmax function to the at least one gradient quality metric of the individual gradient.

3. The system of claim 2, wherein calculating the initial weight factors further includes applying a weight factor neural network model to the at least one gradient quality metric for each individual gradient of the plurality of gradients, wherein the individual weight factor of the initial weight factors for each individual gradient of the plurality of gradients is based on a result of applying the weight factor neural network model to the at least one gradient quality metric of the individual gradient.

4. The system of claim 3, wherein the initial weight factors includes a first set of weight factors based on applying the softmax function to the at least one gradient quality metric for each individual gradient of the plurality of gradients and a second set of weight factors based on applying the weight factor neural network model to the at least one gradient quality metric for each individual gradient of the plurality of gradients;

wherein the at least one memory and the computer program code configured to, with the at least one processor, further cause the at least one processor to:

test the first set of weight factors and the second set of weight factors based on a test data set; and select a set of weight factors from the first set of weight factors and the second set of weight factors based on the testing; and wherein transforming the plurality of gradients into a plurality of weighted gradients based on the calculated initial weight factors includes transforming the plurality of gradients into a plurality of weighted gradients based on the selected set of weight factors.

5. The system of claim 4, wherein the at least one memory and the computer program code configured to, with the at least one processor, further cause the at least one processor to train the weight factor neural network model based on the testing of the first set of weight factors and the second set of weight factors based on the test data set.

6. The system of claim 1, wherein the at least one memory and the computer program code configured to, with the at least one processor, further cause the at least one processor to, based on updating the ASR neural network model based on the global gradient, train the updated ASR neural network model using a held-out data set associated with the task, wherein divergence away from the task caused by updating the ASR neural network model is reduced.

7. The system of claim 1, wherein the plurality of gradient quality metrics include gradient mean values associated with applying the ASR neural network model to each data set of the plurality of data sets.

8. The system of claim 1, wherein the plurality of gradient quality metrics include gradient variance values associated with applying the ASR neural network model to each data set of the plurality of data sets.

9. The system of claim 1, wherein the plurality of gradient quality metrics include training loss values associated with applying the ASR neural network model to each data set of the plurality of data sets.

10. A computerized method for training an automated speech recognition (ASR) neural network model, the method comprising:

applying the ASR neural network model to each data set of a plurality of data sets representing speech data;

generating a plurality of gradients based on applying the ASR neural network model to each data set of the plurality of data sets, wherein an individual gradient of the plurality of gradients is generated based on an individual data set of the plurality of data sets;

determining, prior to updating the ASR neural network model, a plurality of gradient quality metrics for the plurality of gradients;

calculating, prior to updating the ASR neural network model, initial weight factors for the plurality of gradients based on the plurality of gradient quality metrics such that gradients generated from undistorted speech are assigned higher initial weight factors than gradients generated from distorted speech in advance of initial training processes associated with the plurality of data sets;

transforming, prior to updating the ASR neural network model, the plurality of gradients into a plurality of weighted gradients based on the initial weight factors;

generating, prior to updating the ASR neural network model, a global gradient based on an aggregation of the plurality of weighted gradients; and updating the ASR neural network model based on the global gradient such that the resulting updated ASR neural network model is based on the initial training processes associated with the plurality of data sets, wherein the updated ASR neural network model, when applied to the individual data set, performs a task for ASR based on the individual data set and provides model output based on performing the task.

11. The computerized method of claim 10, wherein the plurality of gradient quality metrics include gradient mean values associated with applying the ASR neural network model to each data set of the plurality of data sets.

12. The computerized method of claim 10, wherein the plurality of gradient quality metrics include gradient variance values associated with applying the ASR neural network model to each data set of the plurality of data sets.

13. The computerized method of claim 10, wherein the plurality of gradient quality metrics include training loss values associated with applying the ASR neural network model to each data set of the plurality of data sets.

14. The computerized method of claim 10, wherein calculating the initial weight factors includes applying a softmax function to at least one gradient quality metric for each individual gradient of the plurality of gradients, wherein each individual weight factor of the initial weight factors for each individual gradient of the plurality of gradients is based on a result of applying the softmax function to the at least one gradient quality metric of the individual gradient.

15. The computerized method of claim 14, wherein calculating the initial weight factors further includes applying a weight factor neural network model to the at least one gradient quality metric for each individual gradient of the plurality of gradients, wherein the individual weight factor of the initial weight factors for each individual gradient of the plurality of gradients is based on a result of applying the weight factor neural network model to the at least one gradient quality metric of the individual gradient.

16. One or more non-transitory computer storage media having computer-executable instructions for applying an automated speech recognition (ASR) neural network model to a data set that, upon execution by a processor, cause the processor to at least:
apply the ASR neural network model to each data set of a plurality of data sets representing speech data;
generate a plurality of gradients based on applying the ASR neural network model to each data set of the plurality of data sets, wherein an individual gradient of the plurality of gradients is generated based on an individual data set of the plurality of data sets;
determine, prior to updating the ASR neural network model, a plurality of gradient quality metrics for the plurality of gradients;
calculate, prior to updating the ASR neural network model, initial weight factors for the plurality of gradients based on the plurality of gradient quality metrics such that gradients generated from undistorted speech are assigned higher initial weight factors than gradients generated from distorted speech in advance of initial training processes associated with the plurality of data sets;
transform, prior to updating the ASR neural network model, the plurality of gradients into a plurality of weighted gradients based on the initial weight factors;
generate, prior to updating the ASR neural network model, a global gradient based on an aggregation of the plurality of weighted gradients; and
update the ASR neural network model based on the global gradient such that the resulting updated ASR neural network model is based on the initial training processes associated with the plurality of data sets, wherein the updated ASR neural network model, when applied to the individual data set, performs a task for ASR based on the individual data set and provides model output based on performing the task.

17. The one or more non-transitory computer storage media of claim 16, wherein the plurality of gradient quality metrics include gradient mean values associated with applying the ASR neural network model to each data set of the plurality of data sets.

18. The one or more non-transitory computer storage media of claim 16, wherein the plurality of gradient quality metrics include gradient variance values or training loss values associated with applying the ASR neural network model to each data set of the plurality of data sets.

19. The one or more non-transitory computer storage media of claim 16, wherein calculating the initial weight factors includes applying a softmax function to at least one gradient quality metric for each individual gradient of the plurality of gradients, wherein each individual weight factor of the initial weight factors for each individual gradient of the plurality of gradients is based on a result of applying the softmax function to the at least one gradient quality metric of the individual gradient.

20. The one or more non-transitory computer storage media of claim 19, wherein calculating the initial weight factors further includes applying a weight factor neural network model to the at least one gradient quality metric for each individual gradient of the plurality of gradients, wherein the individual weight factor of the initial weight factors for each individual gradient of the plurality of gradients is based on a result of applying the weight factor neural network model to the at least one gradient quality metric of the individual gradient.

* * * * *